US012812049B2

(12) United States Patent
Komatsu

(10) Patent No.: US 12,812,049 B2
(45) Date of Patent: Nov. 24, 2026

(54) INFORMATION PROCESSING APPARATUS, INFORMATION PROCESSING SYSTEM, NON-TRANSITORY COMPUTER READABLE MEDIUM STORING INFORMATION PROCESSING PROGRAM, AND INFORMATION PROCESSING METHOD CAPABLE OF REDUCING COMMUNICATION VOLUME

(71) Applicant: FUJIFILM Business Innovation Corp., Tokyo (JP)

(72) Inventor: Takashi Komatsu, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 3 days.

(21) Appl. No.: 17/975,562

(22) Filed: Oct. 27, 2022

(65) Prior Publication Data

US 2023/0412743 A1 Dec. 21, 2023

(30) Foreign Application Priority Data

Jun. 17, 2022 (JP) ................................ 2022-098382

(51) Int. Cl.
*H04N 1/00* (2006.01)
*H04N 1/327* (2006.01)

(52) U.S. Cl.
CPC ..... *H04N 1/00493* (2013.01); *H04N 1/00244* (2013.01); *H04N 1/32765* (2013.01)

(58) Field of Classification Search
None
See application file for complete search history.

(56) References Cited

U.S. PATENT DOCUMENTS

2011/0242587 A1* 10/2011 Fukaya ................. G06F 3/1208 358/1.15
2013/0077130 A1* 3/2013 Yoshida ............. H04N 1/32128 358/1.15
2013/0215442 A1* 8/2013 Sato ................... H04N 1/32432 370/352
2015/0029533 A1* 1/2015 Sato .................... G06F 16/9562 358/1.14

(Continued)

FOREIGN PATENT DOCUMENTS

JP 2010085801 4/2010
JP 2015027033 2/2015

(Continued)

OTHER PUBLICATIONS cups.org, "CUPS Implementation of IPP", The Wayback Machine, May 13, 2022, pp. 1-26.

(Continued)

*Primary Examiner* — Abderrahim Merouan
*Assistant Examiner* — Pawan Dhingra
(74) *Attorney, Agent, or Firm* — JCIPRNET

(57) ABSTRACT

An information processing apparatus includes a processor configured to provide an operation screen on which a communication destination is set for an external terminal that operates a processing apparatus that performs predetermined processing in advance for each processing content, and set a command destination of the processing content as the communication destination set for the processing content accepted from the external terminal.

10 Claims, 7 Drawing Sheets

(56) References Cited

U.S. PATENT DOCUMENTS

| | | | | |
|---|---|---|---|---|
| 2016/0156797 | A1* | 6/2016 | Sato | H04N 1/00891 358/1.13 |
| 2021/0152634 | A1* | 5/2021 | Ohshita | G06F 16/93 |
| 2021/0181653 | A1* | 6/2021 | Momiyama | H04N 1/60 |
| 2021/0203798 | A1* | 7/2021 | Ito | H04N 1/00517 |
| 2022/0038586 | A1* | 2/2022 | Sako | G06F 3/1287 |
| 2022/0394142 | A1* | 12/2022 | Sekine | H04N 1/00244 |
| 2023/0029773 | A1 | 2/2023 | Momiyama | |
| 2023/0137214 | A1* | 5/2023 | Sako | G06F 3/1231 358/1.15 |
| 2023/0168844 | A1* | 6/2023 | Nakajima | G06F 3/1258 358/1.13 |
| 2023/0171349 | A1* | 6/2023 | Mizoguchi | H04N 1/2307 358/1.15 |
| 2023/0195397 | A1* | 6/2023 | Kado | G06F 3/14 715/705 |
| 2023/0254432 | A1* | 8/2023 | Kusumoto | B02C 18/0007 241/101.2 |
| 2023/0266929 | A1* | 8/2023 | Tokunaga | G06F 3/12 358/1.14 |

FOREIGN PATENT DOCUMENTS

| | | |
|---|---|---|
| JP | 2017126379 | 7/2017 |
| JP | 2019040327 | 3/2019 |
| JP | 2021081857 | 5/2021 |
| JP | 2021097330 | 6/2021 |
| JP | 2021103477 | 7/2021 |
| JP | 2022025597 | 2/2022 |

OTHER PUBLICATIONS

"Notice of Reasons for Refusal of Japan Counterpart Application", issued on Jun. 9, 2026, with English translation thereof, p. 1-p. 9.

* cited by examiner

INFORMATION PROCESSING APPARATUS, INFORMATION PROCESSING SYSTEM, NON-TRANSITORY COMPUTER READABLE MEDIUM STORING INFORMATION PROCESSING PROGRAM, AND INFORMATION PROCESSING METHOD CAPABLE OF REDUCING COMMUNICATION VOLUME

CROSS-REFERENCE TO RELATED APPLICATIONS

This application is based on and claims priority under 35 USC 119 from Japanese Patent Application No. 2022-098382 filed Jun. 17, 2022.

BACKGROUND

(i) Technical Field

The present disclosure relates to an information processing apparatus, an information processing system, a non-transitory computer readable medium storing an information processing program, and an information processing method.

(ii) Related Art

JP2019-40327A proposes an information processing apparatus in an information processing system in which an on-premises environment and a cloud environment are connected via the Internet. The information processing apparatus includes a workflow execution unit that executes a workflow which is a series of predetermined processing by using data input to a server apparatus, the server apparatus being provided in any one of the on-premises environment or the cloud environment, and a workflow determination unit that determines whether or not to execute a part or all of the processing included in the workflow in any environment of the on-premises environment or the cloud environment based on at least one of data characteristics of data as a processing target of the workflow or processing characteristics of the processing included in the workflow.

JP2021-81857A proposes a data management system that selects any one of an on-premise side server or a cloud side server as a connection destination of the internal terminal in accordance with a communication state between the on-premise side server and the cloud side server or an operation state of the on-premise side server or a cloud side server in a case where a connection request is accepted from an internal terminal.

SUMMARY

There is a technology of connecting a processing apparatus such as an image forming apparatus or an image processing apparatus to an information processing apparatus such as a cloud server and operating the processing apparatus from an external terminal by the information processing apparatus. In this case, data such as a document is exchanged between the processing apparatus and the information processing apparatus, but a communication volume increases in a case where data such as image data is handled.

Aspects of non-limiting embodiments of the present disclosure relate to an information processing apparatus, an information processing system, a non-transitory computer readable medium storing an information processing program, and an information processing method that are capable of reducing a communication volume as compared with a case where a processing apparatus is constantly operated by an information processing apparatus.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to provide an operation screen on which a communication destination is set for an external terminal that operates a processing apparatus that performs predetermined processing in advance for each processing content, and set a command destination of the processing content as the communication destination set for the processing content accepted from the external terminal.

BRIEF DESCRIPTION OF THE DRAWINGS

Exemplary embodiment(s) of the present invention will be described in detail based on the following figures, wherein.

DETAILED DESCRIPTION

Figure 1:
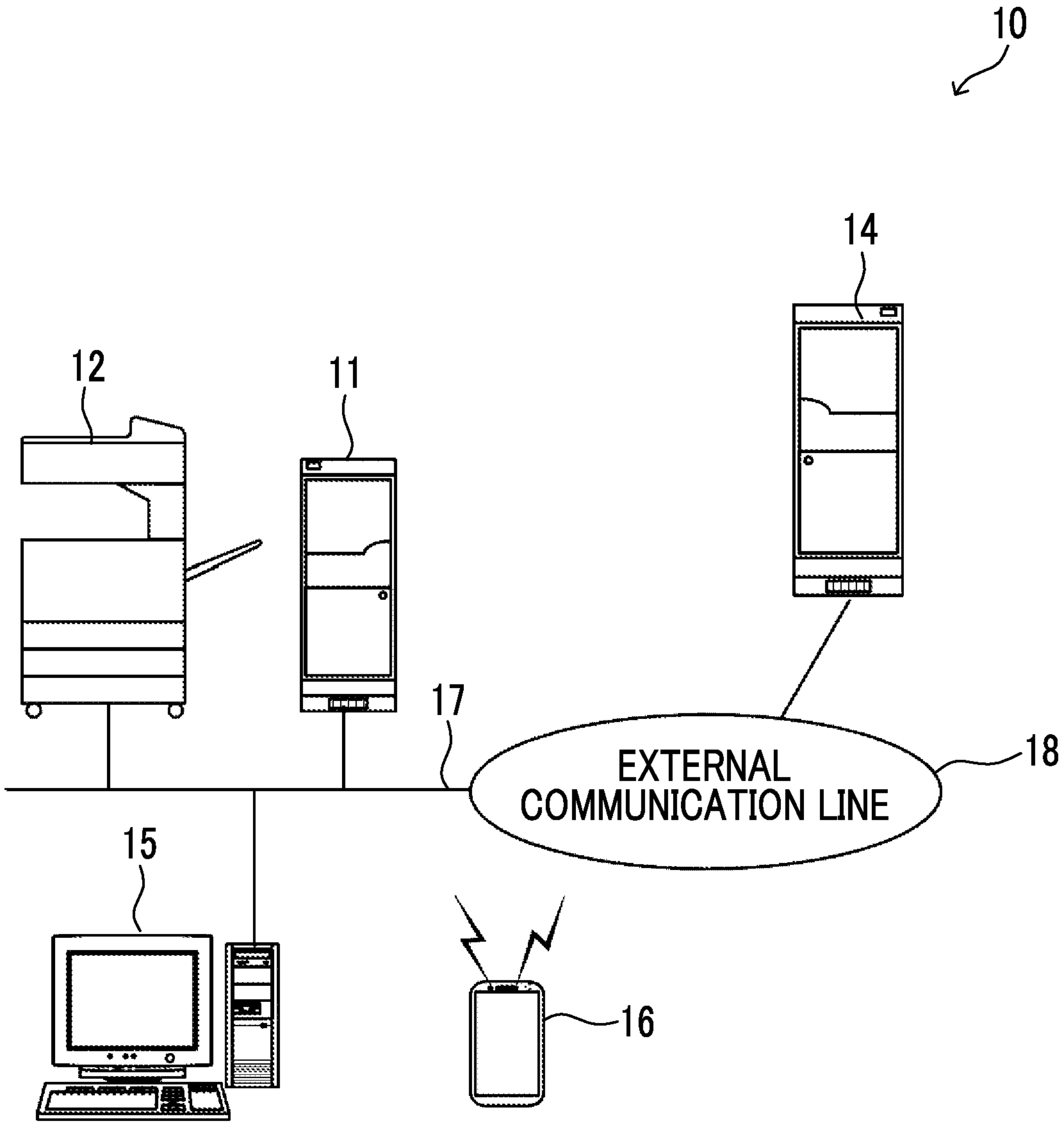
FIG. 1 is a diagram illustrating a schematic configuration of an image forming system according to the present exemplary embodiment.

Hereinafter, an example of an exemplary embodiment of the present disclosure will be described in detail with reference to the drawings. FIG. 1 is a diagram illustrating a schematic configuration of an image forming system according to the present exemplary embodiment. In the present exemplary embodiment, an image forming system 10 will be described as an example of an information processing system.

As illustrated in FIG. 1, the image forming system 10 according to the present exemplary embodiment includes a local server 11, an image forming apparatus 12 as an example of a processing apparatus, a cloud server 14 as an example of an information processing apparatus, a client terminal 15, and a communication terminal 16 as an example of an external terminal. In the present exemplary embodiment, although only one local server 11, one image forming apparatus 12, one cloud server 14, one client terminal 15, and one communication terminal 16 are illustrated, a plurality of apparatuses may be provided. The local server 11 may be omitted.

The local server 11, the image forming apparatus 12, and the client terminal 15 are connected to an internal communication line 17 such as a local area network (LAN) or an intranet. The internal communication line 17 and the cloud server 14 are each connected to an external communication line 18 such as a wide area network (WAN) or the Internet. The communication terminal 16 carried by a user can be connected to the internal communication line 17 and the external communication line 18. The local server 11, the image forming apparatus 12, the cloud server 14, the client terminal 15, and the communication terminal 16 can transmit and receive various kinds of data to and from each other via the internal communication line 17 and the external communication line 18. A mobile phone such as a smartphone, a laptop personal computer (PC), an operation terminal capable of performing wireless communication separately from the image forming apparatus 12, and the like are applied as an example of the communication terminal 16, and an example of the mobile phone is illustrated in FIG. 1.

Figure 2:
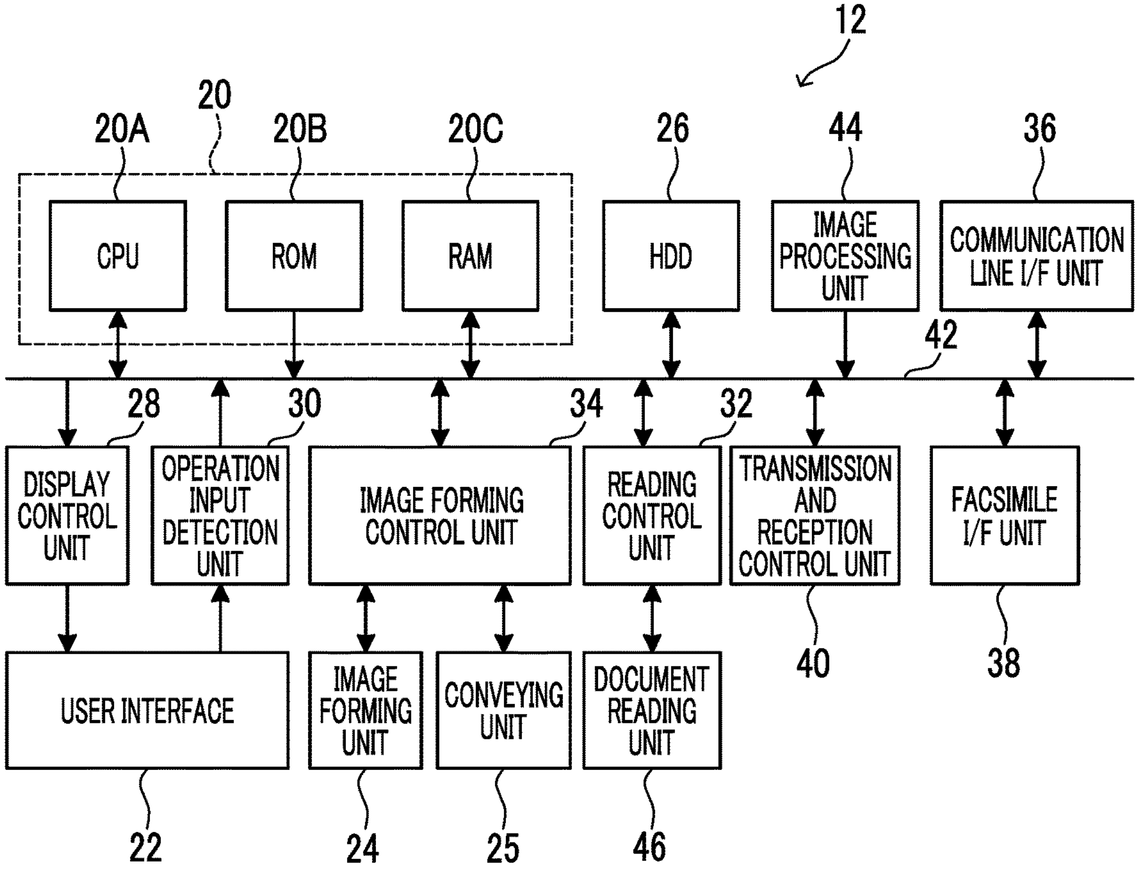
FIG. 2 is a block diagram illustrating a configuration of a part of an electrical system of the image forming apparatus according to the present exemplary embodiment.

FIG. 2 is a block diagram illustrating configurations of parts of an electrical system of the image forming apparatus 12 according to the present exemplary embodiment.

As illustrated in FIG. 2, the image forming apparatus 12 according to the present exemplary embodiment includes a control unit 20 including a central processing unit (CPU) 20A, a read only memory (ROM) 20B, and a random access memory (RAM) 20C. The CPU 20A controls the overall operation of the image forming apparatus 12. The RAM 20C is used as a work area or the like when various programs are executed by the CPU 20A. Various control programs, various parameters, and the like are stored in advance in the ROM 20B. In the image forming apparatus 12, each part of the control unit 20 is electrically connected by a system bus 42.

Meanwhile, the image forming apparatus 12 according to the present exemplary embodiment includes a hard disk drive (HDD) 26 for storing various kinds of data, application programs, and the like. The image forming apparatus 12 includes a display control unit 28 that is connected to a user interface 22 and controls the display of various operation screens and the like on a display of the user interface 22. The image forming apparatus 12 includes an operation input detection unit 30 that is connected to the user interface 22 and detects an operation instruction input via the user interface 22. In the image forming apparatus 12, the HDD 26, the display control unit 28, and the operation input detection unit 30 are electrically connected to the system bus 42. Although the image forming apparatus 12 according to the present exemplary embodiment describes the example in which the HDD 26 is provided, the present invention is not limited thereto, and a non-volatile storage unit such as a flash memory may be provided.

The image forming apparatus 12 according to the present exemplary embodiment includes a reading control unit 32 that controls a reading operation of an optical image by a document reading unit 46 and a document feeding operation by a document conveying unit, and an image forming control unit 34 that controls image forming processing by an image forming unit 24 and conveying of paper to the image forming unit 24 by a conveying unit 25. The image forming apparatus 12 includes a communication line interface (communication line I/F) unit 36 that is connected to the internal communication line 17 and transmits and receives communication data to and from other apparatuses connected to the internal communication line 17, and an image processing unit 44 that performs various kinds of image processing. The image forming apparatus 12 includes a facsimile interface (facsimile I/F) unit 38 connected to a telephone line (not illustrated) and transmits and receives facsimile data to and from a facsimile apparatus connected to the telephone line. The image forming apparatus 12 includes a transmission and reception control unit 40 that controls transmission and reception of facsimile data via the facsimile interface unit 38. In the image forming apparatus 12, the transmission and reception control unit the reading control unit 32, the image forming control unit 34, the communication line interface unit 36, the facsimile interface unit 38, and the image processing unit 44 are electrically connected to the system bus 42.

With the above configuration, the image forming apparatus 12 according to the present exemplary embodiment executes accesses to the RAM 20C, the ROM 20B, and the HDD 26 by the CPU 20A. The image forming apparatus 12 executes control of the display of information such as an operation screen and various messages on the display of the user interface 22 via the display control unit 28 by the CPU 20A. The image forming apparatus 12 executes control of activations of the document reading unit 46 and the document conveying unit via the reading control unit 32 by the CPU The image forming apparatus 12 executes control of activations of the image forming unit 24 and the conveying unit 25 via the image forming control unit 34 and controls the transmission and reception of communication data via the communication line interface unit 36 by the CPU 20A. The image forming apparatus 12 executes control of the transmission and reception of facsimile data via the facsimile interface unit 38 by the transmission and reception control unit 40 by the CPU 20A. The image forming apparatus 12 grasps operation contents in the user interface 22 based on operation information detected by the operation input detection unit 30 by the CPU 20A, and executes various kinds of controls based on the operation contents. In the following description, forming an image on paper may be referred to as printing.

Figure 3:
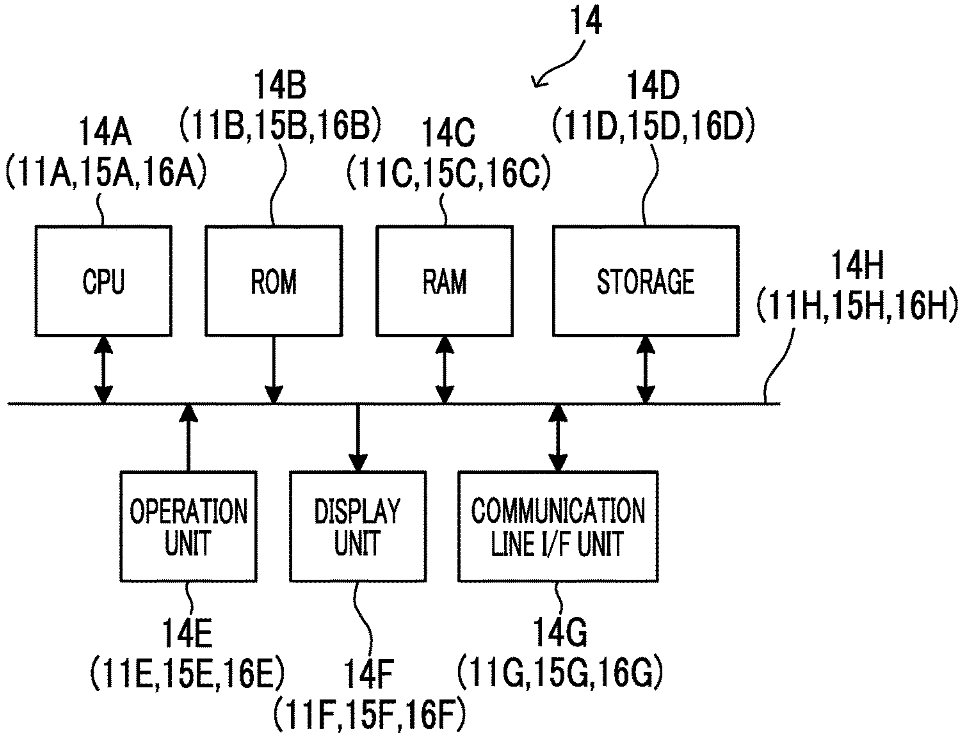
FIG. 3 is a block diagram illustrating a configuration of parts of electrical systems of a local server, a cloud server, a client terminal, and a communication terminal according to the present exemplary embodiment.

Next, configurations of parts of electrical systems of the local server 11, the cloud server 14, the client terminal 15, and the communication terminal 16 according to the present exemplary embodiment will be described. FIG. 3 is a block diagram illustrating the configurations of the parts of the electrical systems of the local server 11, the cloud server 14, the client terminal 15, and the communication terminal 16 according to the present exemplary embodiment. Since the local server 11, the cloud server 14, the client terminal 15, and the communication terminal 16 have basically a configuration of a general computer, the cloud server 14 will be described as a representative, and the local server 11, the client terminal 15, the communication terminal 16 will not be described, and only the corresponding reference numerals are illustrated in FIG. 3.

As illustrated in FIG. 3, the cloud server 14 according to the present exemplary embodiment includes a CPU 14A, a ROM 14B, a RAM 14C, a storage 14D, an operation unit 14E, a display unit 14F, and a communication line interface (I/F) unit 14G. The CPU 14A controls the overall operation of the cloud server 14. Various control programs, various parameters, and the like are stored in advance in the ROM 14B. The RAM 14C is used as a work area or the like when various programs are executed by the CPU 14A. The storage 14D stores various kinds of data, application programs, and the like. The operation unit 14E is used to input various kinds of information. The display unit 14F is used to display various kinds of information. The communication line interface unit 14G is connected to the external communication line 18 and transmits and receives various kinds of data to and from other apparatuses connected to the external communication line 18. Each part of the above cloud server 14 is electrically connected by a system bus 14H. The cloud server 14 according to the present exemplary embodiment includes the storage 14D as a storage unit. As the storage 14D, for example, a non-volatile storage unit such as an HDD or a flash memory is applied. The local server 11, the client terminal 15, and the communication line interface unit 16G of the communication terminal 16 are connected to the internal communication line 17 and transmit and receive various kinds of data to and from other apparatuses connected to the internal communication line 17.

With the above configuration, the cloud server 14 according to the present exemplary embodiment executes accesses to the ROM 14B, the RAM 14C, and the storage 14D, acquisition of various kinds of data via the operation unit 14E, and display of various kinds of information on the display unit 14F by the CPU 14A. The cloud server 14 executes control of the transmission and reception of communication data via the communication line interface unit 14G by the CPU 14A.

In the image forming system 10 according to the present exemplary embodiment having the above-described configuration, for example, the local server 11, the image forming apparatus 12, and the client terminal 15 are provided within the company. The image forming apparatus 12 can be used from the outside via the cloud server 14 by the communication terminal 16.

Figure 4:
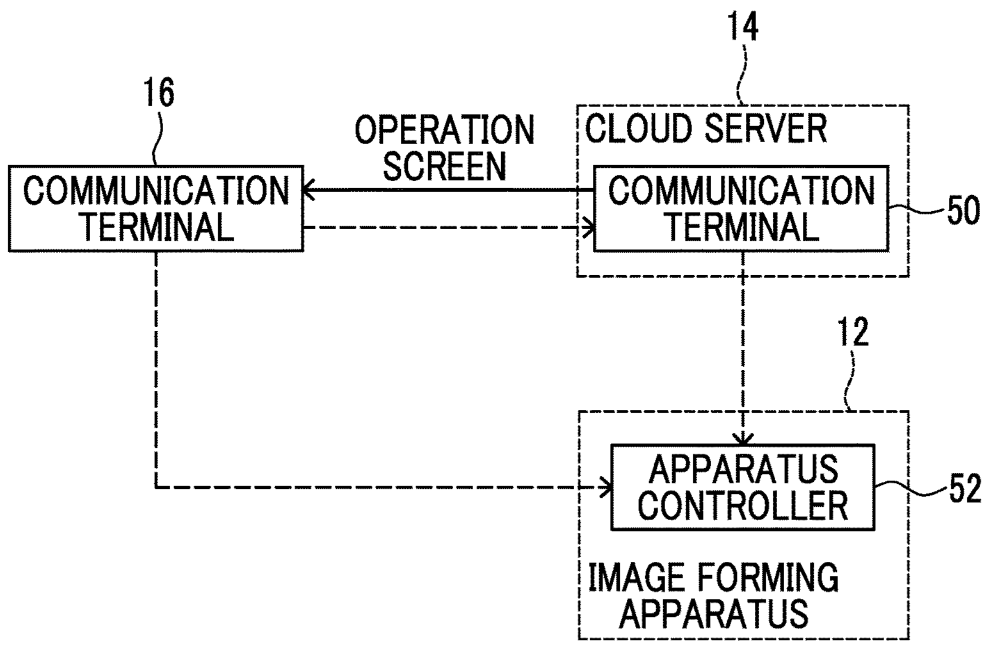
FIG. 4 is a functional block diagram illustrating a functional configuration of the image forming system according to the present exemplary embodiment.

The image forming system 10 according to the present exemplary embodiment has, on the cloud server 14 side, functions of a cloud controller 50 for controlling the image forming apparatus 12 as the functions realized by the processing of the CPU 14A. On the other hand, the image forming apparatus 12 has functions of an apparatus controller 52 for the functions realized by the processing of the CPU 20A. FIG. 4 is a functional block diagram illustrating a functional configuration of the image forming system 10 according to the present exemplary embodiment.

The cloud controller 50 provides an operation screen to the communication terminal 16 via a browser. The communication terminal 16 is operated by the user, and thus, the apparatus controller 52 is controlled via the cloud controller 50. Accordingly, the image forming apparatus 12 is operated. That is, the apparatus controller 52 accepts an operation of the image forming apparatus 12 from the cloud controller 50.

A Uniform Resource Locator (URL) is set for each of the image forming apparatus 12 and the cloud controller 50, and the apparatus controller 52 also accepts an operation of the image forming apparatus 12 from the communication terminal 16. Accordingly, the image forming apparatus 12 is directly controlled without using the cloud controller 50 by connecting to the URL of the image forming apparatus 12 from the communication terminal 16 or the client terminal 15.

The user can implement an operation of documents stored in the image forming apparatus 12 from the communication terminal 16 or the client terminal 15 via a browser. The user first connects to the image forming apparatus 12 by using the URL on the cloud controller 50 side from the browser in order to operate the image forming apparatus from outside the company by using a laptop PC or the like.

Upon accepting the connection, the cloud controller 50 communicates with the image forming apparatus 12, and returns a response to the browser in a case where the connection is permitted. Upon returning to the browser, the cloud controller 50 performs processing of changing a communication path and processing according to an instructed job, an operation content, and a data content and setting a communication destination of the response to the cloud controller 50 or the image forming apparatus 12.

Specifically, in a case where the connection is accepted from the communication terminal 16, the cloud server 14 generates an operation screen on which a communication destination is set for each processing content of the image forming apparatus 12 in advance for the communication terminal 16 that operates the image forming apparatus 12, and provides the operation screen to the communication terminal 16 via a browser. Processing of setting a command destination of the processing content as the communication destination set for the processing content accepted from the communication terminal 16 is performed.

Figure 5:
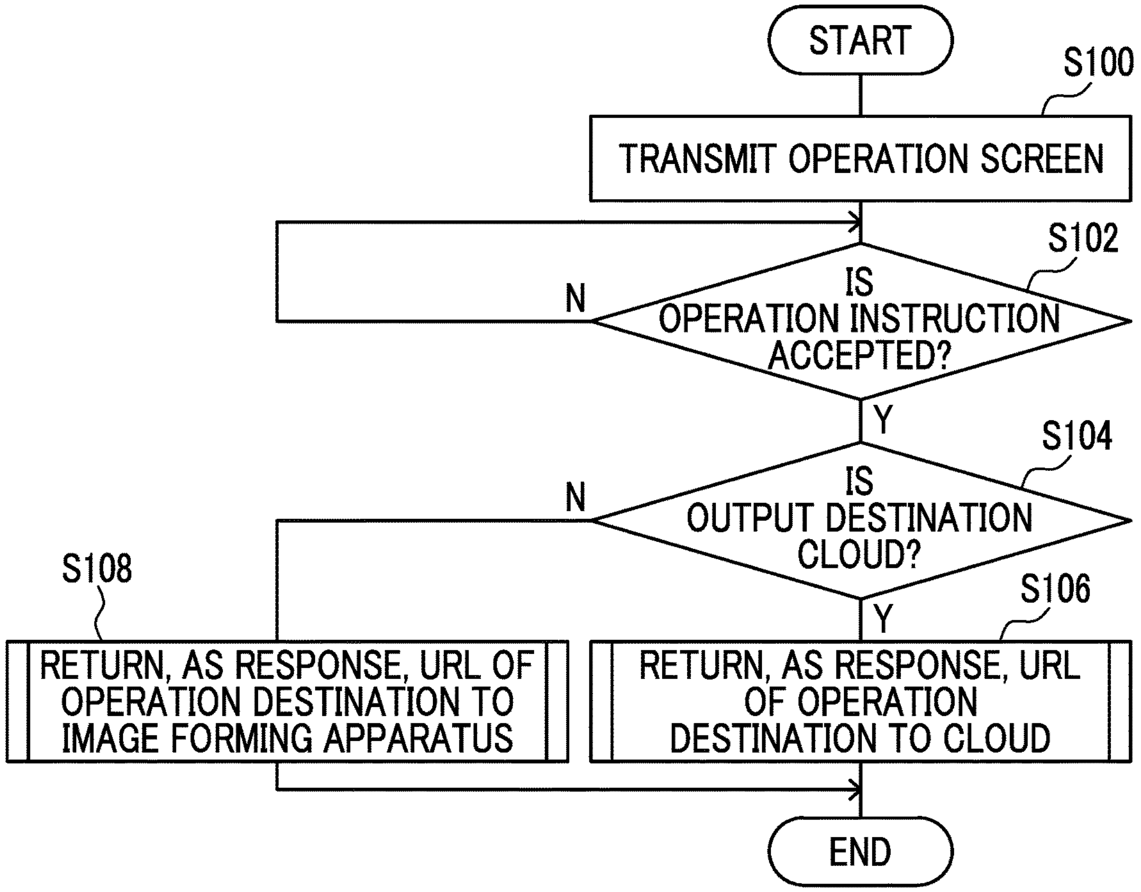
FIG. 5 is a flowchart illustrating an example of a flow of processing performed by a cloud server 14 of the image forming system according to the present exemplary embodiment.

Next, specific processing performed by the cloud server 14 of the image forming system 10 according to the present exemplary embodiment having the above-described configuration will be described. FIG. 5 is a flowchart illustrating an example of the processing performed by the cloud server 14 of the image forming system 10 according to the present exemplary embodiment. The processing of FIG. 5 is started in a case where the user operates the communication terminal 16 to connect to the cloud server 14, for example.

In step S100, the CPU 14A transmits an operation screen to be displayed on the browser to the communication terminal 16, and proceeds to step S102. As the operation screen to be transmitted, an operation screen on which the URL of the communication destination is set for each processing content of the image forming apparatus 12 in advance is transmitted.

In step S102, the CPU 14A determines whether or not an operation instruction is accepted. This determination is performed by determining whether or not a selection result of the processing content of the operation screen is received from the communication terminal 16. The CPU waits until the determination is positive, and proceeds to step S104.

In step S104, the CPU 14A determines whether or not an output destination is the cloud server 14. That is, it is determined whether or not the URL of the communication destination set for the selected processing content is the cloud server 14. In a case where the determination is positive, the CPU proceeds to step S106. In a case where the URL of the communication destination set for the selected processing content is the image forming apparatus 12, the determination is negative, and the CPU proceeds to step S108.

In step S106, the CPU 14A performs processing of setting the URL of the operation destination to the cloud server 14 and returning a response, and ends the series of processing.

That is, processing of operating the image forming apparatus 12 from the communication terminal 16 via the cloud server 14 is performed.

On the other hand, in step S108, the CPU 14A performs processing of setting the URL of the operation destination to the image forming apparatus 12 and returning a response, and ends the series of processing. That is, processing of directly operating the image forming apparatus 12 from the communication terminal 16 is performed.

The communication destination controls a connection destination of a communication source in this manner, and thus, flexible control is performed. In a case where the image forming apparatus 12 and the cloud server 14 are controlled or managed, an intended operation is performed without being aware of the communication destination, and a communication volume, communication charges, and the number of transactions are reduced, and security is improved.

Figure 6:
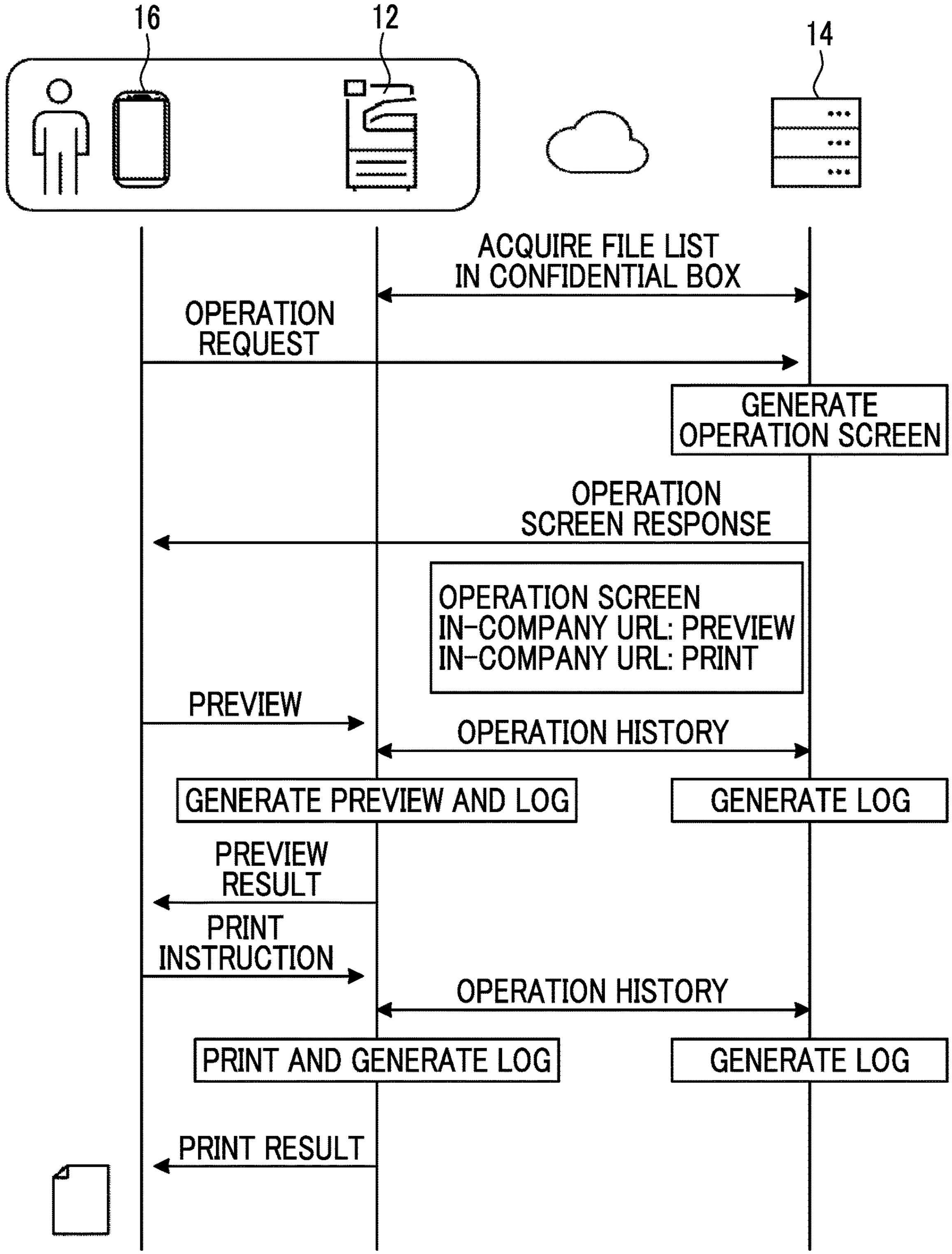
FIG. 6 is a sequence diagram illustrating an example of a flow of processing of the image forming system in a case where data printing in a confidential box is performed from the communication terminal.

Next, a specific example of the processing content of the image forming apparatus 12 will be described. First, as an example of the processing content, a case where data printing in a confidential box is performed will be described. FIG. 6 is a sequence diagram illustrating an example of a flow of processing of the image forming system 10 in a case where the data printing in the confidential box is performed from the communication terminal 16. In the example of FIG. 6, an example in which it is assumed that a smartphone, a tablet terminal, or the like is applied as the communication terminal 16 will be described. The confidential box is a storage region set in advance for each user, and is a storage region for storing documents read and documents received by the image forming apparatus 12, mails, and the like for each user.

In the case of the data printing in the confidential box, the cloud controller 50 acquires a document list in the confidential box from the image forming apparatus 12, and returns the operation screen to the user in a case where an operation request is accepted from the communication terminal 16. On the operation screen to be returned, for example, the URL of the image forming apparatus 12 side that can be operated only within the company is set as the communication destination for a "preview" button and a "print instruction" button. For example, a private Internet Protocol (IP) address, short-range wireless communication such as WiFi (registered trademark), and the like are applied as an URL that can be operated only within the company.

Here, in a case where the user operates the communication terminal 16 and operates the "preview" button, as illustrated in FIG. 6, the communication destination is switched based on the URL that can be operated only within the set company, and thereafter, the image forming apparatus 12 side implements response and processing for the printing. As a result, transfer of images between the image forming apparatus 12 and the cloud server 14, which is required for preview display on the cloud controller 50 side, is omitted, and the communication volume is reduced.

In the example of FIG. 6, in a case where the "preview" button is operated, an operation history is shared and stored between the image forming apparatus 12 and the cloud server 14. On the image forming apparatus 12 side, a preview is generated and logs are generated and stored. On the cloud server 14 side, logs of an operation history of the image forming apparatus 12 are generated and stored. By sharing the operation history, operations or contents that are not operated by one of the image forming apparatus and the cloud server are supplemented as operation logs on the other thereof.

The image forming apparatus 12 transmits a preview result to the communication terminal 16 according to an instruction from the communication terminal 16.

In the communication terminal 16, in a case where the user checks the preview result and operates a "print" button, a print instruction is directly transmitted to the image forming apparatus 12.

In the image forming apparatus 12, the operation history is shared and stored by the image forming apparatus 12 and the cloud server 14. The image forming apparatus 12 side performs printing and generates and stores logs, and the cloud server 14 side generates and stores logs of an operation history.

The image forming apparatus 12 outputs a print result according to an instruction from the communication terminal 16, and ends the series of printing in the confidential box.

Figure 7:
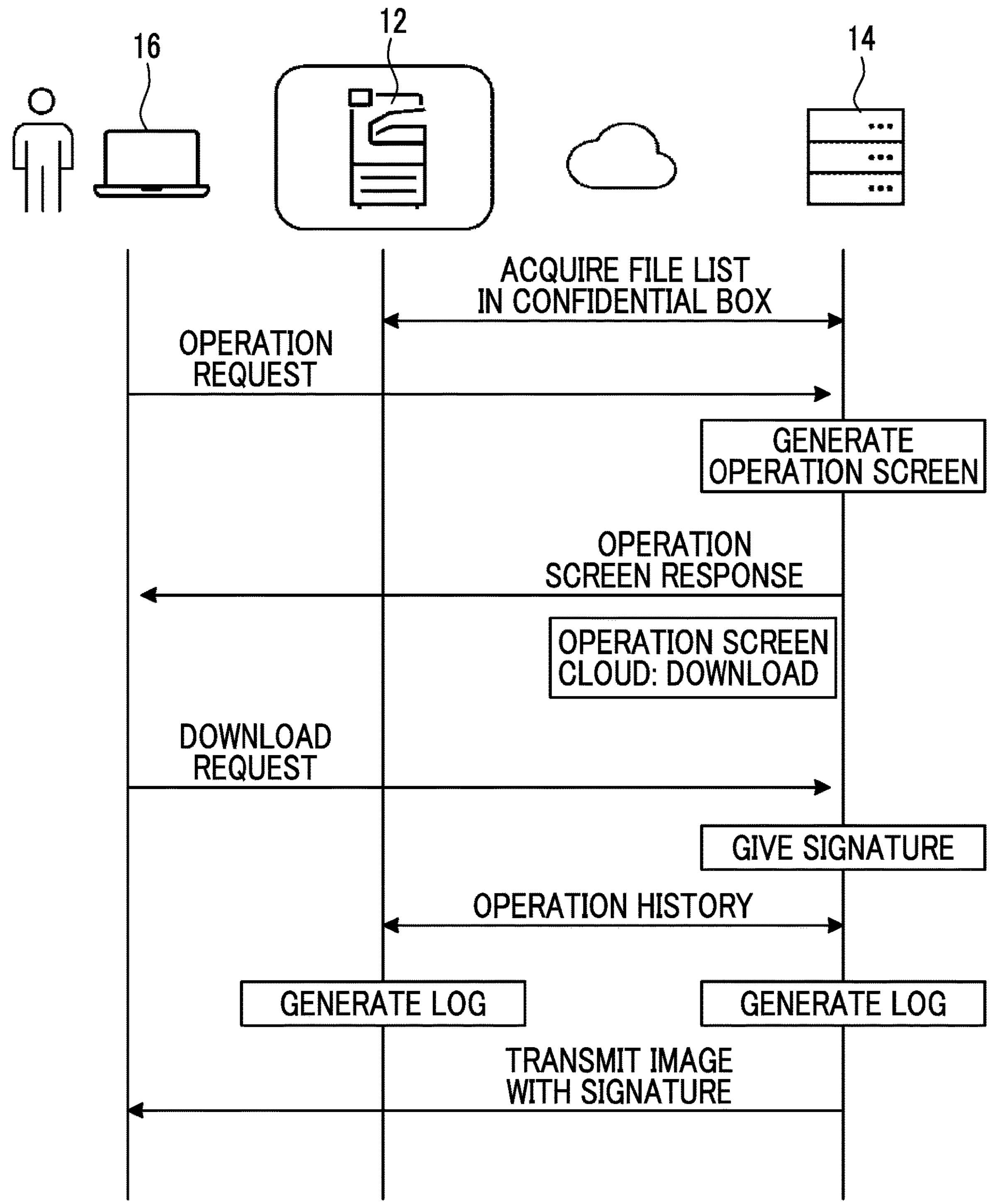
FIG. 7 is a sequence diagram illustrating an example of a flow of processing of the image forming system in a case where files in the confidential box are transferred to the communication terminal such as a laptop PC.

Next, a case where files in a confidential box are transferred to the communication terminal 16 will be described as an example of the processing content. FIG. 7 is a sequence diagram illustrating an example of a flow of processing of the image forming system 10 in a case where the files in the confidential box are transferred to the communication terminal 16 such as a laptop PC. In the example of FIG. 7, an example in which it is assumed that a laptop PC or the like is applied as the communication terminal 16 will be described.

In the case of transferring the files in the confidential box to the communication terminal 16, the cloud controller 50 acquires a list of the files in the confidential box from the image forming apparatus 12 in advance, and returns the operation screen to the user in a case where the operation request is accepted from the communication terminal 16. On the operation screen to be returned, for example, the URL (QUIC) of the image forming apparatus 12 side that can be operated even from the cloud server 14 is set as the communication destination in a "download" button. As the URL of the image forming apparatus 12 side that can be operated even from the cloud server 14, for example, a global IP address or the like is applied.

Here, in a case where the user operates the communication terminal 16 and operates the "download" button, the communication destination is switched based on the set URL, and a download request is issued to the cloud server 14 from the communication terminal 16 as illustrated in FIG. 7. Thereafter, the cloud server 14 side implements response and processing for the download request. As a result, a security hash value and the like when the files are transferred from the image forming apparatus 12 to the cloud server 14 are not calculated.

In the example of FIG. 7, in a case where the "download" button is operated, a download request is transmitted from the communication terminal 16 to the cloud server 14, and the cloud controller 50 performs the calculation of a hash value of a target file and the like and gives a signature to the file. The operation history is shared and stored by the image forming apparatus 12 and the cloud server 14. By sharing the operation history, operations or contents that are not operated by one of the image forming apparatus and the cloud server are supplemented as operation logs on the other thereof.

The cloud controller 50 transmits the file with the signature to the communication terminal 16, and ends the series of transferring of the files in the confidential box.

Depending on security strength and a hash value of an original document, the URL of the image forming apparatus 12 may be switched to an URL of the cloud controller 50 of the cloud only inside the company or an URL of a cloud server outside the company in a case where the hash value is unnecessary. Alternatively, HTTP, QUIC, and the like may be switched according to the importance of the image and the capabilities of the browser side.

Figure 8:
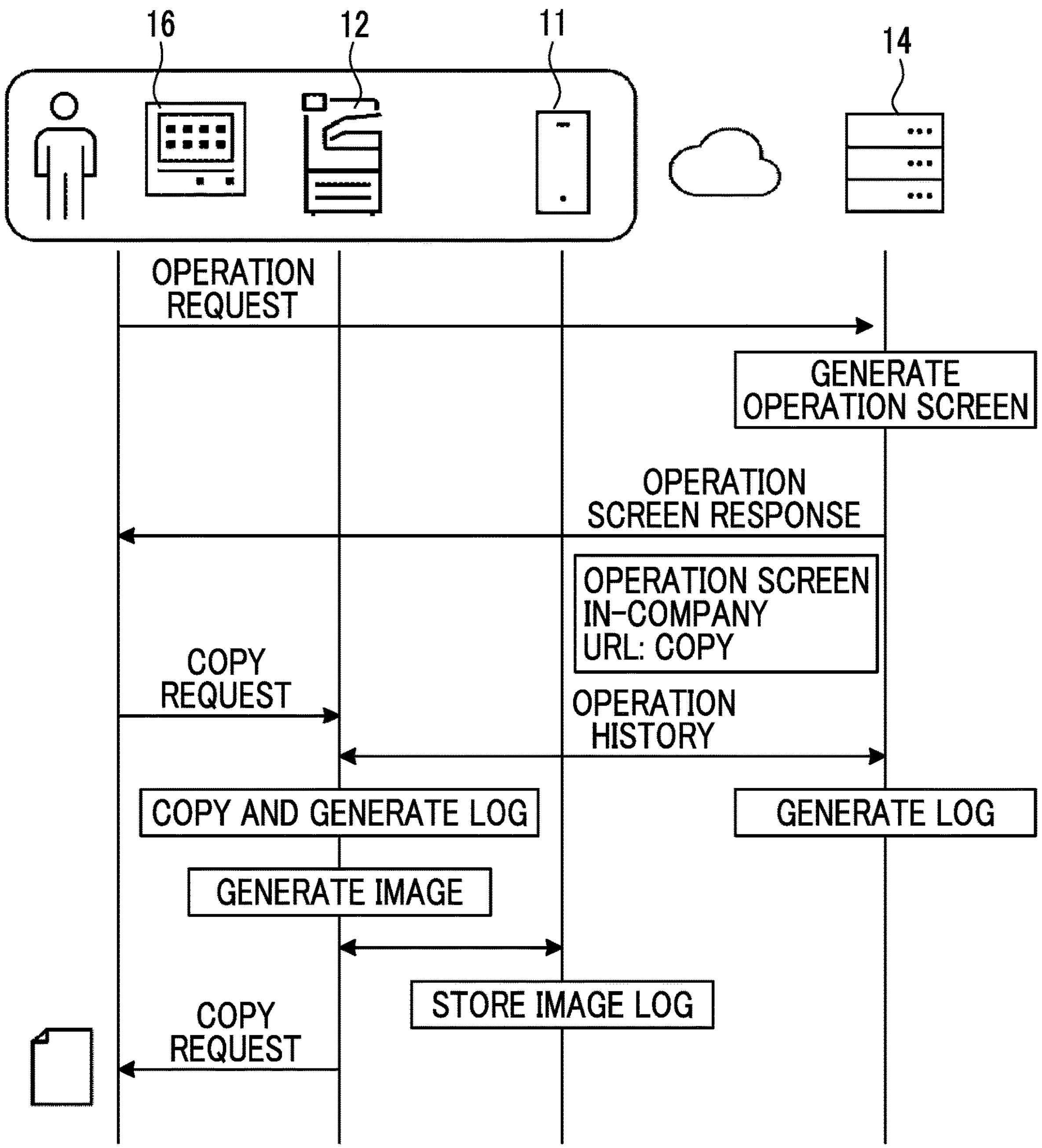
FIG. 8 is a sequence diagram illustrating an example of a flow of processing of the image forming system in a case where a copy operation of the image forming apparatus is performed.

Next, a case of a copy operation (with image log acquisition) from the image forming apparatus 12 will be described as an example of the processing content. FIG. 8 is a sequence diagram illustrating an example of a flow of processing of the image forming system 10 in a case where the copy operation of the image forming apparatus 12 is performed. In the example of FIG. 8, an example in which an operation terminal that is separated from the image forming apparatus 12 and is capable of wirelessly communicating with the image forming apparatus 12 is applied as the communication terminal 16 will be described.

In the case of the copy operation from the image forming apparatus 12, the cloud controller 50 returns the operation screen to the user in a case where the operation request is accepted from the communication terminal 16. The URL of the image forming apparatus 12 side which can be operated only within the company is set as the communication destination on the operation screen to be returned, for example, for a "copy" button or a "copy" tab. For example, a private IP address, short-range wireless communication such as WiFi (registered trademark), and the like are applied as an URL that can be operated only within the company.

Here, in a case where the user operates the communication terminal 16 and operates the "copy" button or the "copy" tab, the communication destination is switched based on the set URL that can only be operated within the company, and a copy request is issued to the image forming apparatus 12 from the communication terminal 16 as illustrated in FIG. 8. Thereafter, the image forming apparatus 12 side implements response and processing for the copy.

In the example of FIG. 8, in a case where the "copy" button or the "copy" tab is operated, the copy request is transmitted from the communication terminal 16 to the image forming apparatus 12. The image forming apparatus 12 shares the operation history with the cloud server 14 by accepting the copy request and transmitting the operation history to the cloud server 14. By sharing the operation history, operations or contents that are not operated by one of the image forming apparatus and the cloud server are supplemented as operation logs on the other thereof.

The image forming apparatus 12 performs copying, generates logs, generates an image log, transfers the logs to the local server 11 functioning as an image log server inside the company, and stores the image log in the local server 11.

In a case where the operation history is shared with the cloud server 14, the image forming apparatus 12 collects behaviors related to operations into one and transmits operation information to the cloud server 14.

The cloud server 14 generates and stores a system log from the operation information. Since the operation information cannot be transferred to the local server, the cloud server 14 stores the history generated from the operation information. That is, only small pieces of user operation information are exchanged instead of sending a large system log, and the cloud server 14 stores the reproduced system log.

In the image forming system 10 according to the present exemplary embodiment, in the case of a debug mode, logs, image data, and the like of results of various kinds of processing on the image forming apparatus 12 side can be transferred from the image forming apparatus 12 to the cloud server 14 regardless of a load.

Figure 9:
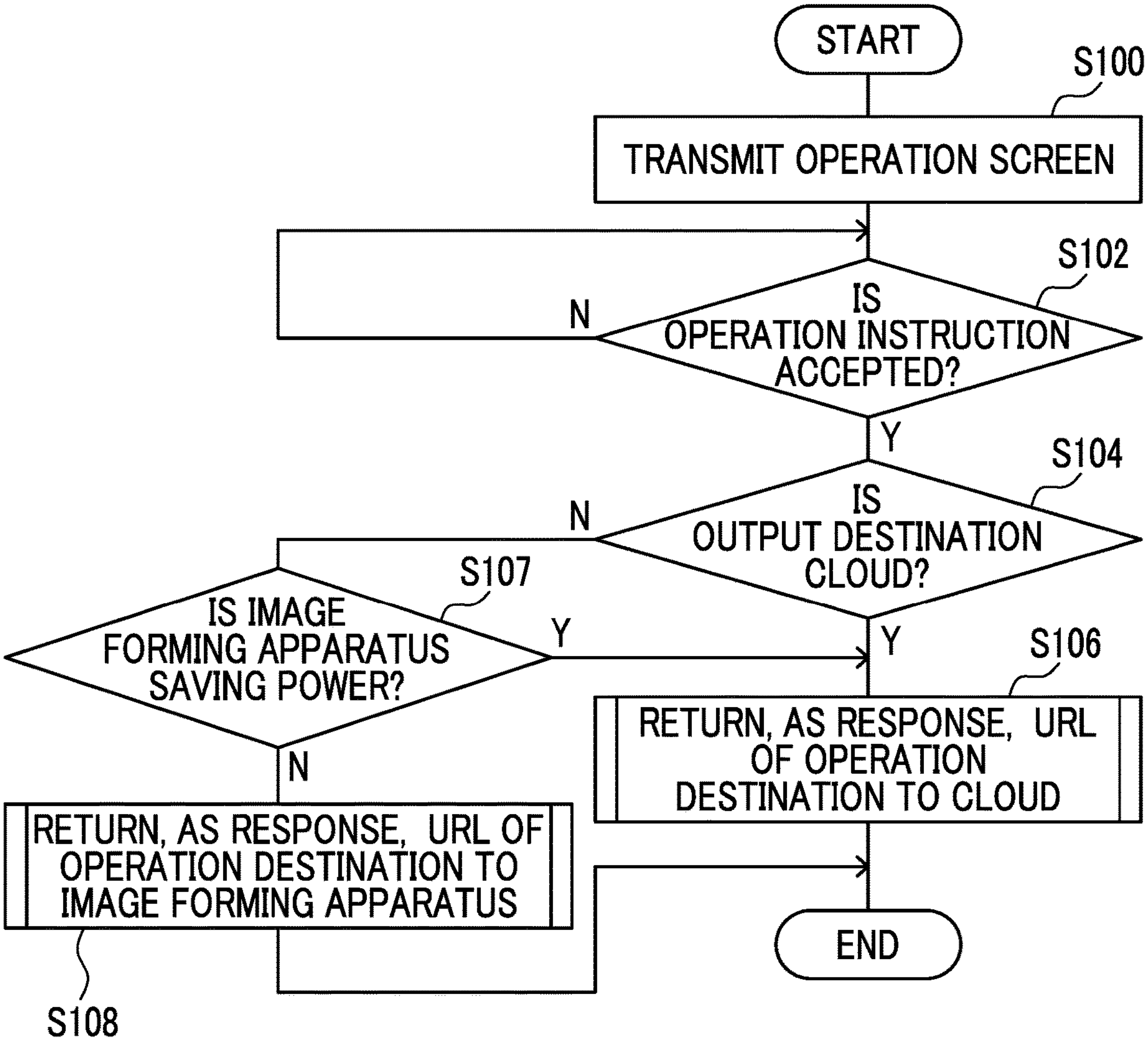
FIG. 9 is a flowchart illustrating a modification example of the flow of the processing performed by the cloud server of the image forming system according to the present exemplary embodiment.

Next, in a modification example of the processing performed by the cloud server 14 will be described. FIG. 9 is a flowchart illustrating the modification example of the processing performed by the cloud server 14 of the image forming system 10 according to the present exemplary embodiment. The processing of FIG. 9 is started in a case where the user operates the communication terminal 16 to connect to the cloud server 14, for example. The processing identical to the processing of FIG. 5 will be described with the identical reference numeral.

In step S100, the CPU 14A transmits an operation screen to be displayed on the browser to the communication terminal 16, and proceeds to step S102. As the operation screen to be transmitted, an operation screen on which the URL of the communication destination is set for each processing content of the image forming apparatus 12 in advance is transmitted.

In step S102, the CPU 14A determines whether or not an operation instruction is accepted. This determination is performed by determining whether or not a selection result of the processing content of the operation screen is received from the communication terminal 16. The CPU waits until the determination is positive, and proceeds to step S104.

In step S104, the CPU 14A determines whether or not an output destination is the cloud server 14. That is, it is determined whether or not the URL of the communication destination set for the selected processing content is the cloud server 14. In a case where the determination is positive, the CPU proceeds to step S106. In a case where the URL of the communication destination set for the selected processing content is the image forming apparatus 12, the determination is negative, and the CPU proceeds to step S107.

In step S106, the CPU 14A performs processing of setting the URL of the operation destination to the cloud server 14 and returning a response, and ends the series of processing. That is, processing of operating the image forming apparatus 12 from the communication terminal 16 via the cloud server 14 is performed.

On the other hand, in step S107, the CPU 14A checks an operation status of the image forming apparatus 12 and determines whether or not the image forming apparatus 12 is saving power. The CPU proceeds to step S106 in a case where the determination is positive, and proceeds to step S108 in a case where the determination is negative.

In step S108, the CPU 14A performs processing of setting the URL of the operation destination to the image forming apparatus 12 and returning a response, and ends the series of processing. That is, processing of directly operating the image forming apparatus 12 from the communication terminal 16 is performed.

Although it has been described that the image forming apparatus 12 is used as an example of the processing apparatus in the above exemplary embodiment, the processing apparatus is not limited to the image forming apparatus 12. For example, instead of the image forming apparatus 12, an image forming apparatus may be applied as a processing apparatus, or another processing apparatus may be applied.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The processing performed in each part of the image forming system 10 according to the above exemplary embodiment may be processing performed by software, processing performed by hardware, or processing in which both the software and the hardware are combined. The processing performed in each part of the image forming system 10 may be stored in a storage medium as a program and distributed.

The present disclosure is not limited to the above description, and it is needless to say that the present disclosure can be variously modified and implemented within a range not deviating from the gist thereof.

The following additional appendices are disclosed regarding the above exemplary embodiment.

(((1)))

An information processing apparatus including a processor configured to provide an operation screen on which a communication destination is set for an external terminal that operates a processing apparatus that performs predetermined processing in advance for each processing content, and set a command destination of the processing content as the communication destination set for the processing content accepted from the external terminal.

(((2)))

The information processing apparatus according to (((1))), in which the processor is configured to further perform processing of setting the command destination as the communication destination corresponding to an operation status of the processing apparatus.

(((3)))

The information processing apparatus according to (((2))), in which the processor is configured to set the information processing apparatus as the communication destination in a case where the operation status is a power saving state.

(((4)))

The information processing apparatus according to any one of (((1))) to (((3))), in which the processor is configured to transmit, to the processing apparatus, an operation history in which the processing apparatus is operated by the information processing apparatus and receive, from the processing apparatus, the operation history in which the processing apparatus is directly operated from the external terminal.

(((5)))

The information processing apparatus according to any one of (((1))) to (((4))), in which the processor is configured to receive information regarding a processing result processed in the processing apparatus from the processing apparatus in a case of a predetermined debug mode.

(((6)))

The information processing apparatus according to any one of (((1))) to (((5))), in which on the operation screen, a communication destination is set for the information processing apparatus and the processing apparatus in advance for each processing content.

(((7)))

The information processing apparatus according to (((6))), in which the processor is configured to set the processing apparatus as the command destination in a case where a processing content in which print data stored in a storage region set for the processing apparatus in advance for each user is to be printed is accepted as the processing content.

(((8)))

The information processing apparatus according to (((6))), in which the processor is configured to acquire in advance a file list stored in a storage region set for the processing apparatus in advance for each user, and set the information processing apparatus as the command destination in a case where a processing content in which a file stored in the storage region set for the processing apparatus in advance for each user is transferred to the external terminal is accepted.

(((9)))

The information processing apparatus according to (((6))), in which the processing apparatus is an image forming apparatus, and the external terminal is an operation terminal that is separated from the image forming apparatus and is capable of wirelessly communicating with the image forming apparatus, and the processor is configured to set the image forming apparatus as the command destination in a case where a processing content in which a copy operation from the operation terminal is to be performed is accepted.

(((10)))

An information processing system including the information processing apparatus according to (((1))), the processing apparatus, and the external terminal.

(((11)))

A non-transitory computer readable medium storing an information processing program causing a computer to execute processing of providing an operation screen on which a communication destination is set for an external terminal that operates a processing apparatus that performs predetermined processing in advance for each processing content, and setting a command destination of the processing content as the communication destination set for the processing content accepted from the external terminal.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:

a processor configured to:

acquire in advance a file list stored in a storage region set for a processing apparatus in advance for each user;

generate an operation screen on which a communication destination is set in advance for each processing content of the processing apparatus that performs predetermined processing, wherein the communication destination set for the each processing content is either the information processing apparatus or the processing apparatus;

transmit the operation screen to an external terminal that operates the processing apparatus; and set a command destination of a selected processing content, among the each processing content, as the communication destination set in advance for the selected processing content accepted from the external terminal, wherein in a case where a processing content in which a file stored in the storage region set for the processing apparatus in advance for each user is transferred to the external terminal is accepted, the processor sets the information processing apparatus as the command destination.

2. The information processing apparatus according to claim 1, wherein the processor is configured to:

set the command destination as the communication destination corresponding to an operation status of the processing apparatus.

3. The information processing apparatus according to claim 2, wherein the processor is configured to:

set the information processing apparatus as the communication destination in a case where the operation status is a power saving state.

4. The information processing apparatus according to claim 1, wherein the processor is configured to:

transmit, to the processing apparatus, an operation history in which the processing apparatus is operated by the information processing apparatus; and receive, from the processing apparatus, the operation history in which the processing apparatus is directly operated from the external terminal.

5. The information processing apparatus according to claim 1, wherein the processor is configured to:

receive information regarding a processing result processed in the processing apparatus from the processing apparatus in a case of a predetermined debug mode.

6. The information processing apparatus according to claim 1, wherein the processor is configured to:

set the processing apparatus as the command destination in a case where a processing content in which print data stored in a storage region set for the processing apparatus in advance for each user is to be printed is accepted as the processing content.

7. The information processing apparatus according to claim 1, wherein the processing apparatus is an image forming apparatus, and the external terminal is an operation terminal that is separated from the image forming apparatus and is capable of wirelessly communicating with the image forming apparatus, and the processor is configured to:

set the image forming apparatus as the command destination in a case where a processing content in which a copy operation from the operation terminal is to be performed is accepted.

8. An information processing system comprising:

the information processing apparatus according to claim 1;

the processing apparatus; and the external terminal.

9. A non-transitory computer readable medium storing an information processing program causing a computer serving as an information processing apparatus to execute processing of:

acquiring in advance a file list stored in a storage region set for a processing apparatus in advance for each user;

generating an operation screen on which a communication destination is set in advance for each processing content of the processing apparatus that performs predetermined processing, wherein the communication destination set for the each processing content is either the information processing apparatus or the processing apparatus;

transmitting the operation screen to an external terminal that operates the processing apparatus; and setting a command destination of a selected processing content, among the each processing content, as the communication destination set in advance for the selected processing content accepted from the external terminal, wherein in a case where a processing content in which a file stored in the storage region set for the processing apparatus in advance for each user is transferred to the external terminal is accepted, the information processing apparatus is set as the command destination.

10. An information processing method performed by an information processing apparatus, the information processing method comprising:

acquiring in advance a file list stored in a storage region set for a processing apparatus in advance for each user;

generating an operation screen on which a communication destination is set in advance for each processing content of the processing apparatus that performs predetermined processing, wherein the communication destination set for the each processing content is either the information processing apparatus or the processing apparatus;

transmitting the operation screen to an external terminal that operates the processing apparatus; and setting a command destination of a selected processing content, among the each processing content, as the communication destination set in advance for the selected processing content accepted from the external terminal, wherein in a case where a processing content in which a file stored in the storage region set for the processing apparatus in advance for each user is transferred to the external terminal is accepted, the information processing apparatus is set as the command destination.

* * * * *